(12) United States Patent  (10) Patent No.: US 11,814,003 B2
Sato  (45) Date of Patent: Nov. 14, 2023

(54) HEAD PROTECTING AIRBAG DEVICE WITH INFLATOR ATTACHMENT BRACKET

(71) Applicant: TOYODA GOSEI CO., LTD., Kiyosu (JP)

(72) Inventor: Jun Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/460,407

(22) Filed: Aug. 30, 2021

(65) Prior Publication Data

US 2022/0080916 A1  Mar. 17, 2022

(30) Foreign Application Priority Data

Sep. 15, 2020 (JP) .................................. 2020-154699

(51) Int. Cl.
*B60R 21/213* (2011.01)

(52) U.S. Cl.
CPC .................................. *B60R 21/213* (2013.01)

(58) Field of Classification Search
CPC . B60R 21/213; B60R 21/2171; B60R 21/232; B60R 2021/2177
See application file for complete search history.

(56) References Cited

U.S. PATENT DOCUMENTS

| 6,082,761 | A | * | 7/2000 | Kato ..................... | B60R 21/213 |
| | | | | | 280/730.2 |
| 6,485,048 | B2 | * | 11/2002 | Tajima .................. | B60R 21/213 |
| | | | | | 280/730.2 |

(Continued)

FOREIGN PATENT DOCUMENTS

| JP | 2004-74867 A | 3/2004 | |
| JP | 2012232664 A | * 11/2012 | ........... B60R 21/213 |

(Continued)

OTHER PUBLICATIONS

Japanese Office Action dated Apr. 26, 2023 issued in corresponding JP application No. 2020-154699 (and English translation).

*Primary Examiner* — Laura Freedman
(74) *Attorney, Agent, or Firm* — POSZ LAW GROUP, PLC

(57) ABSTRACT

A head protecting airbag device includes an airbag that is folded and stored on an upper edge side of a window on an interior vehicle side; an inflator that supplies inflation gas to the airbag; and an attachment bracket that attaches the inflator to a body side on the upper edge side of the window. The inflator has a substantially cylindrical outer shape of which an axial direction is disposed substantially along a front-rear direction. The attachment bracket includes a holding portion that is formed by being curved in a substantially arc-shaped cross section, is disposed so as to partially cover an outer peripheral surface of the inflator, and is configured to be capable of holding the inflator using connecting means, and an attachment piece portion that is formed so as to extend from an end edge of the holding portion on an exterior vehicle side and that is attached to the body side by using attachment means. The holding portion is disposed so as to cover and support a lower surface side of the inflator in a state where the airbag device is mounted in a vehicle.

4 Claims, 7 Drawing Sheets

(56) References Cited

U.S. PATENT DOCUMENTS

| | | | | |
|---|---|---|---|---|
| 7,077,424 B2* | 7/2006 | Inoue | ............... | B60R 21/232 |
| | | | | 280/730.2 |
| 7,631,908 B2* | 12/2009 | Meier | ............... | F16B 2/005 |
| | | | | 292/262 |
| 8,007,000 B2* | 8/2011 | Gammill | ............... | B60R 21/232 |
| | | | | 280/730.2 |
| 8,215,664 B2* | 7/2012 | Arima | ............... | B60R 21/2171 |
| | | | | 280/730.2 |
| 8,596,672 B2* | 12/2013 | Sugiyama | ............... | B60R 21/213 |
| | | | | 280/730.2 |
| 8,727,371 B2* | 5/2014 | Ochiai | ............... | B60R 21/213 |
| | | | | 280/730.2 |
| 9,566,933 B2* | 2/2017 | Jinnai | ............... | B60R 21/232 |
| 10,053,047 B2* | 8/2018 | Jinnai | ............... | B60R 21/262 |
| 10,106,120 B2* | 10/2018 | Konaka | ............... | B60R 21/2171 |
| 2004/0256843 A1* | 12/2004 | Totani | ............... | B60R 21/213 |
| | | | | 280/730.2 |
| 2021/0253056 A1* | 8/2021 | Ichimura | ............... | B60R 21/232 |

FOREIGN PATENT DOCUMENTS

| | | | | |
|---|---|---|---|---|
| JP | 2014012466 A * | 1/2014 | ............ | B60R 21/213 |
| JP | 2017-114440 A | 6/2017 | | |
| JP | 2019-59355 A | 4/2019 | | |

* cited by examiner

FIG. 4

HEAD PROTECTING AIRBAG DEVICE WITH INFLATOR ATTACHMENT BRACKET

CROSS REFERENCE TO RELATED APPLICATIONS

The present application claims priority from Japanese Patent Application No. 2020-154699 of Sato, filed on Sep. 15, 2020, the entire disclosures of which are incorporated herein by reference.

BACKGROUND

1. Technical Field

The present disclosure relates to a head protecting airbag device with a configuration including an airbag which is configured to cover a window of a vehicle when being unfolded and inflated, and which is folded and stored on an upper edge side of the window on an interior vehicle side, an inflator which supplies inflation gas to the airbag, and an attachment bracket which attaches the inflator to a body side on the upper edge side of the window.

2. Description of Related Art

In the related art, as a head protecting airbag device, as shown in JP-A-2017-114440, an attachment bracket for attaching an inflator on a body side is configured to include a holding portion which holds the inflator using separate connecting means and an attachment piece portion to be attached to the body side using attachment means. In the head protecting airbag device of the related art, the holding portion is curved so as to substantially follow along an outer peripheral surface of the inflator and is formed so as to cover an upper surface side of the inflator when being mounted in a vehicle. Then, the holding portion is configured to hold the inflator by using the connecting means disposed so as to surround an outer peripheral side together with the inflator. The attachment piece portion is configured to extend from an end edge of the holding portion on an exterior vehicle side.

In the head protecting airbag device, when the airbag is unfolded and inflated, the inflator receives a force to be pulled downward by the airbag into which the inflation gas flows and which is unfolded so as to protrude downward from the upper edge side of the window. In the head protecting airbag device of the related art, the holding portion of the attachment bracket is disposed so as to cover the upper surface side of the inflator, and holds the inflator using the connecting means disposed on a periphery thereof. Therefore, the attachment bracket cannot directly support the inflator with respect to an unfolding direction of the airbag, and there is room for improvement in the stability of holding the inflator in the attachment bracket.

SUMMARY

An aspect of the present disclosure is to provide a head protecting airbag device having the following configuration.

The head protecting airbag device includes an airbag that is configured to cover a window of a vehicle when being unfolded and inflated, and that is folded and stored on an upper edge side of the window on an interior vehicle side; an inflator that has a substantially cylindrical outer shape of which an axial direction is disposed substantially along a front-rear direction and that supplies inflation gas to the airbag; and an attachment bracket that attaches the inflator to a body side on the upper edge side of the window, in which the attachment bracket is made of sheet metal, and includes a holding portion that is formed by being curved in a substantially arc-shaped cross section so as to substantially follow along an outer peripheral surface of the inflator, is disposed so as to partially cover the outer peripheral surface of the inflator, and is configured to be capable of holding the inflator using connecting means disposed so as to surround an entire circumference in a circumferential direction on an outer peripheral side of the inflator, and an attachment piece portion that is formed so as to extend from an end edge of the holding portion on an exterior vehicle side and that is attached to the body side by using attachment means, and the holding portion is disposed so as to cover and support a lower surface side of the inflator in a state where the airbag device is mounted in the vehicle.

BRIEF DESCRIPTION OF DRAWINGS

FIG. 4 is a schematic front view showing the attachment bracket of FIG. 3 and an inflator.

DETAILED DESCRIPTION

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

Figure 1:
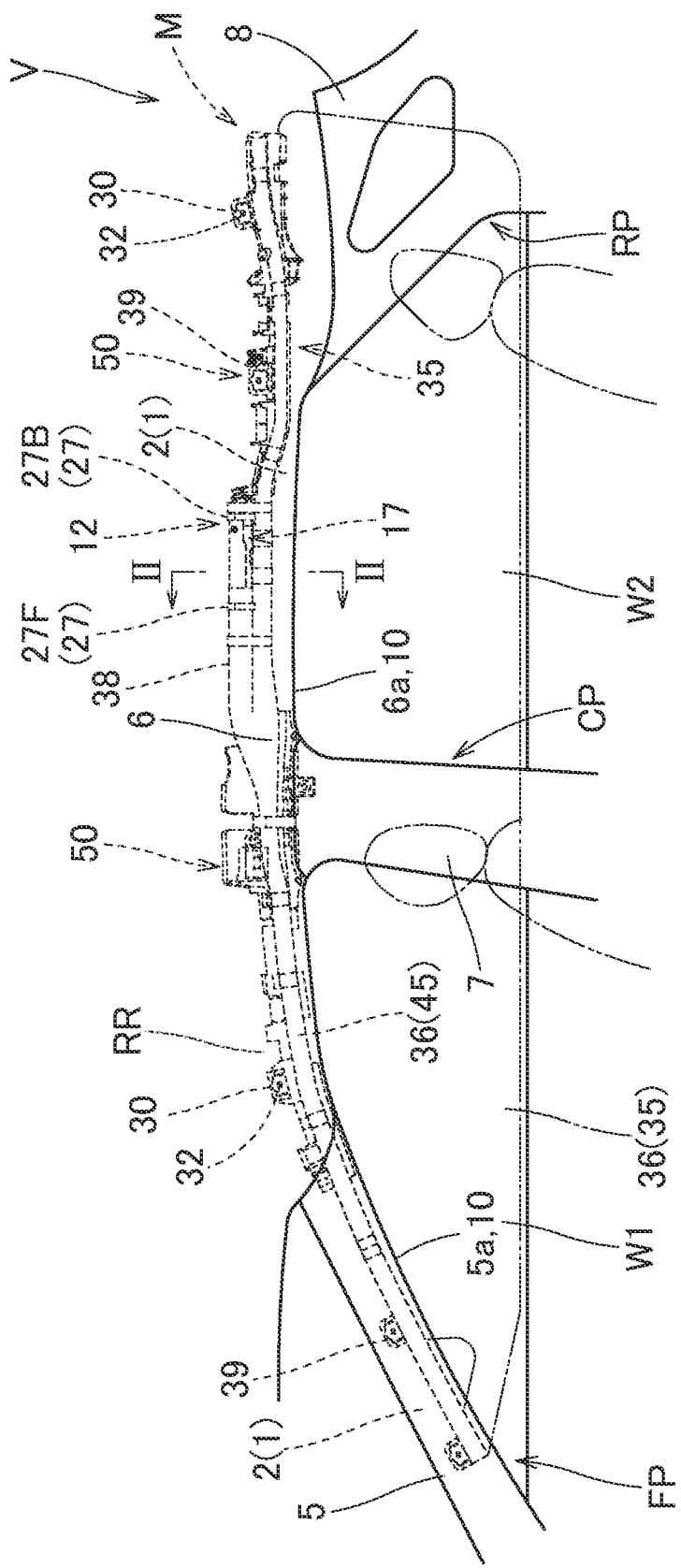
FIG. 1 is a schematic front view showing a head protecting airbag device according to an embodiment of the present disclosure when viewed from an interior vehicle side.

An embodiment of the present disclosure will be described with reference to the drawings. As shown in FIG. 1, a head protecting airbag device M according to the embodiment folds and stores an airbag 35 in circumference edges of upper edge sides of windows W1 and W2, that is, a range from a front pillar portion FP via a roof side rail portion RR to the vicinity of an upper side of a rear pillar portion RP, to be capable of covering the windows (side windows) W1 and W2 of a vehicle V on an interior vehicle side when being completely inflated. In the case of the embodiment, in the vehicle V, one center pillar portion CP is disposed between the front pillar portion FP and the rear pillar portion RP so as to substantially follow along an up-down direction. Thus, as indicated by a two-dot chain line of FIG. 1, the airbag 35 (bag body 36 which is described later), when being completely inflated, is configured to also cover the interior vehicle side of a part of an intermediate pillar garnish 7 disposed in the center pillar portion CP and a part of a rear pillar garnish 8 disposed in the rear pillar portion RP together with the windows W1 and W2.

Figure 2:
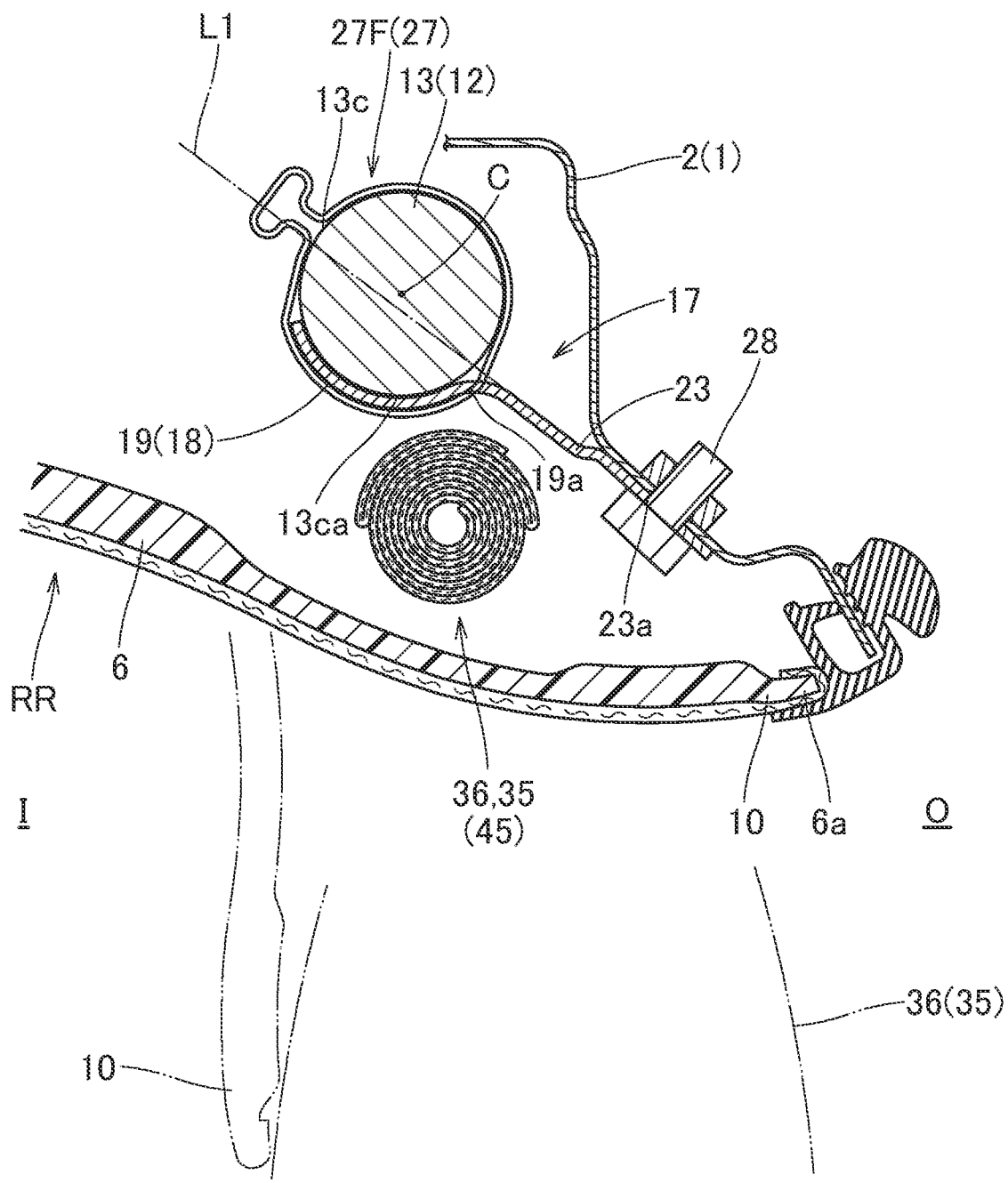
FIG. 2 is a vertical sectional view showing a state in which the head protecting airbag device according to the embodiment is mounted in the vehicle, which corresponds to a portion taken along line II-II of FIG. 1.

As shown in FIGS. 1 and 2, the head protecting airbag device M includes the airbag 35, an inflator 12 that supplies inflation gas to the airbag 35, attachment brackets 17 and 30, bolts (attachment means) 28 and 32, a clamp 27 (connecting means), and a case 50 that stores the folded airbag 35 (completely folded body 45). The folded airbag 35, the inflator 12, the case 50, and the attachment brackets 17 and 30, and are stored in a state in which an interior vehicle side I is covered by an airbag cover 10 when being mounted in the vehicle V (see FIGS. 1 and 2). In the case of the embodiment, the airbag cover 10 is configured with a lower edge 5a of a front pillar garnish 5 covering the interior vehicle side of the front pillar portion FP and a lower edge 6a of a roof head lining 6 covering the interior vehicle side of the roof side rail portion RR.

The front pillar garnish 5 and the roof head lining 6, together with the intermediate pillar garnish 7 and the rear pillar garnish 8, are made of synthetic resin. The front pillar garnish 5 and the roof head lining 6 are attached to the interior vehicle side I of the inner panel 2 that is a member on a body 1 side of the front pillar portion FP and the roof side rail portion RR by the attachment means (not shown). Thus, the airbag cover 10 configured with these lower edges 5a and 6a of the front pillar garnish 5 and the roof head lining 6 is pressed by the airbag 35 to cause the airbag 35 to protrude at the time of being unfolded and inflated so as to open the lower edges 5a and 6a to the interior vehicle side I (see FIGS. 1, 2, and 9).

Figure 4:
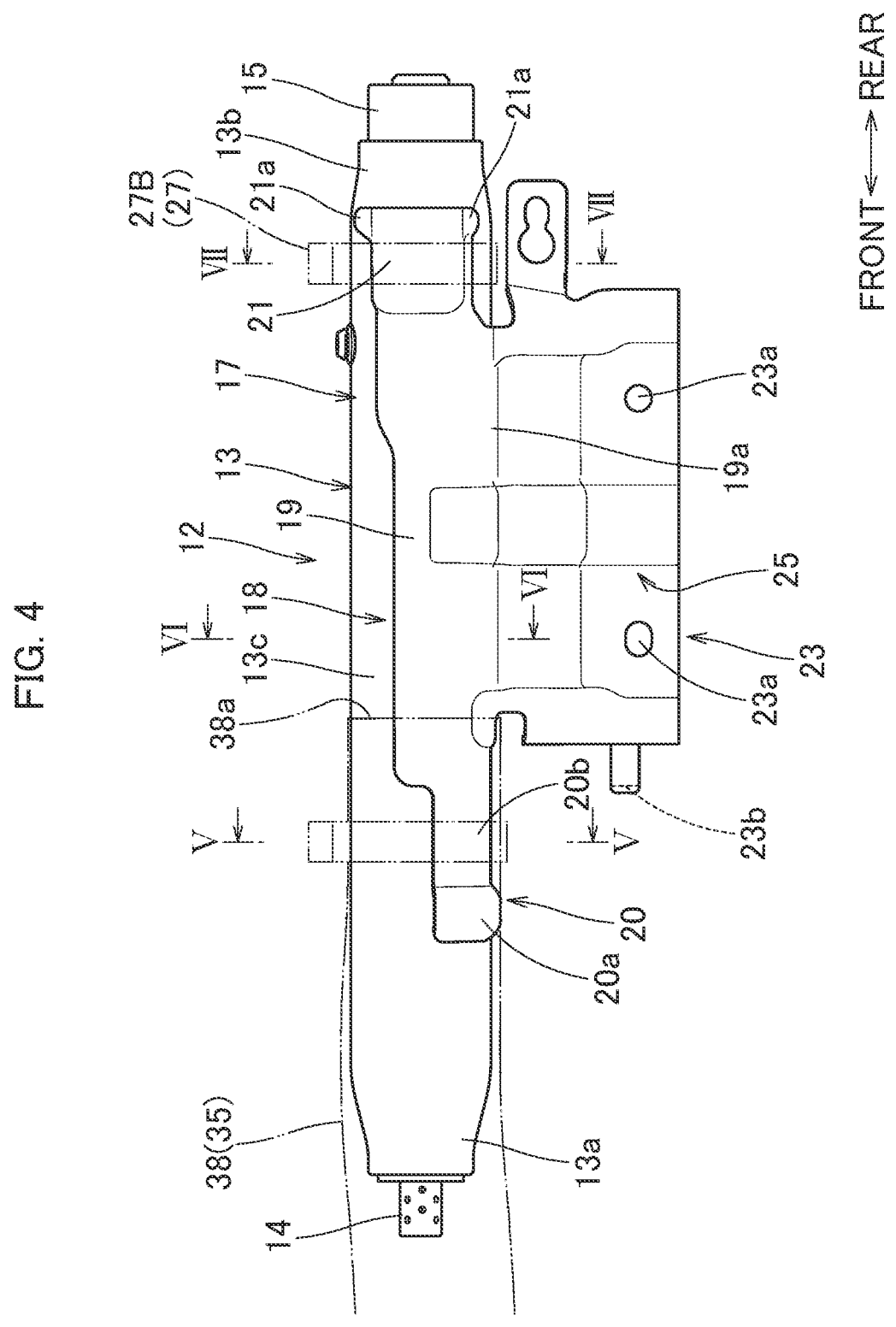

The inflator 12 supplies the inflation gas to the airbag 35 and as shown in FIGS. 1, 2, and 4, has a substantially cylindrical outer shape of which an axial direction is disposed substantially along the front-rear direction. In the case of the embodiment, as shown in FIG. 1, the inflator 12 is disposed in an area above the window W2, which is an upper area in the vicinity of a center of the airbag 35 (completely folded body 45) in the front-rear direction. As shown in FIG. 4, the inflator 12 includes a substantially cylindrical body portion 13, a gas discharge port portion 14 disposed on one end side of the body portion 13 in the front-rear direction, and a connection port portion 15 disposed on the other end side of the body portion 13 in the axial direction. In the case of the embodiment, the gas discharge port portion 14 is disposed on a front end 13a side of the body portion 13, has a smaller diameter than that of the body portion 13, and is disposed of a number of gas discharge ports (reference numeral is omitted) which are open to be capable of discharging inflation gas. The connection port portion 15 disposed on a rear end 13b side, which is the other end side of the body portion 13, is provided for connecting a connector (not shown) to which a lead wire for inputting an operation signal is connected. In the embodiment, the inflator 12 has a configuration in which the front end 13a side (gas discharge port portion 14 side) of the body portion 13 is inserted into an inflow port portion 38 (described later) of the airbag 35, and the rear end 13b side (connection port portion 15 side) of the body portion 13 protrudes from the inflow port portion 38 so as to connect to the airbag 35 by using a clamp 27 (27F) (connecting member) disposed on an outer peripheral side of the rear end 38a side of the inflow port portion 38 (see FIG. 4). The inflator 12 is attached to an inner panel 2 by using the attachment bracket 17, the clamps 27 (27F and 27B) as the connecting members, and a bolt (attachment means) 28 for fixing the attachment bracket 17 to the inner panel 2 on the body 1 side.

The attachment bracket 17 is made of sheet metal and is disposed so as to cover the interior vehicle side I of the inflator 12 as shown in FIGS. 2 and 4 to 7. In the case of the embodiment, the attachment bracket 17 is formed by pressing a sheet metal material. Specifically, as shown in FIGS. 3 and 4, the attachment bracket 17 includes a holding portion 18 that holds the body portion 13 of the inflator 12 and an attachment piece portion 23 that extends from the holding portion 18 and that is attached to the inner panel 2 on the body 1 side.

Figure 3:
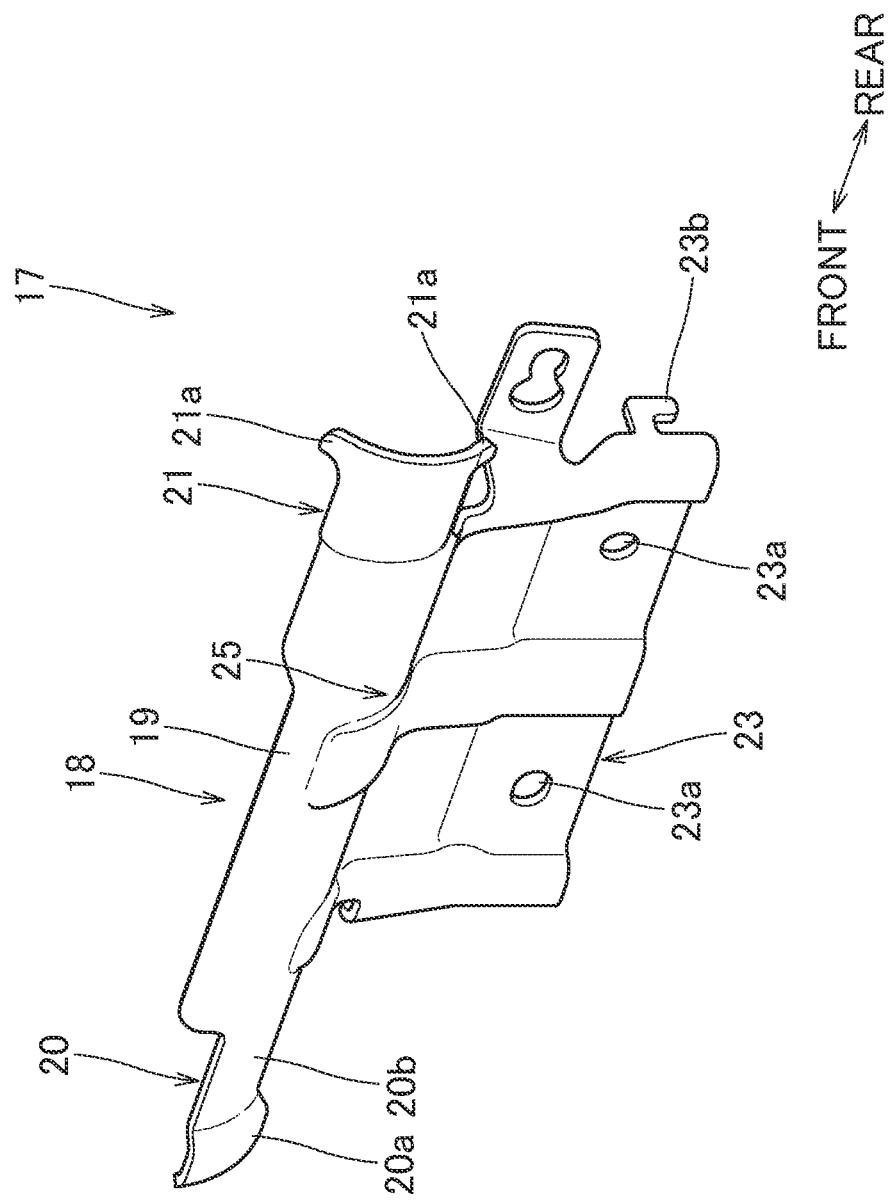
FIG. 3 is a schematic perspective view of an attachment bracket used in the head protecting airbag device of the embodiment.
Figure 5:
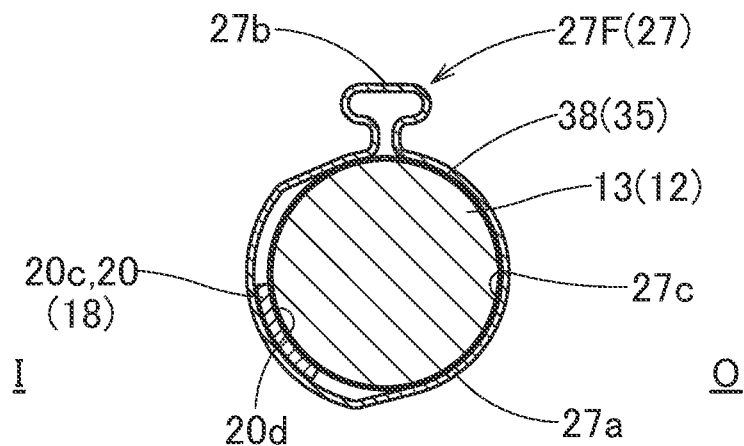
FIG. 5 is a schematic partial end view of the attachment bracket and the inflator, which corresponds to a portion taken along line V-V of FIG. 4.
Figure 6:
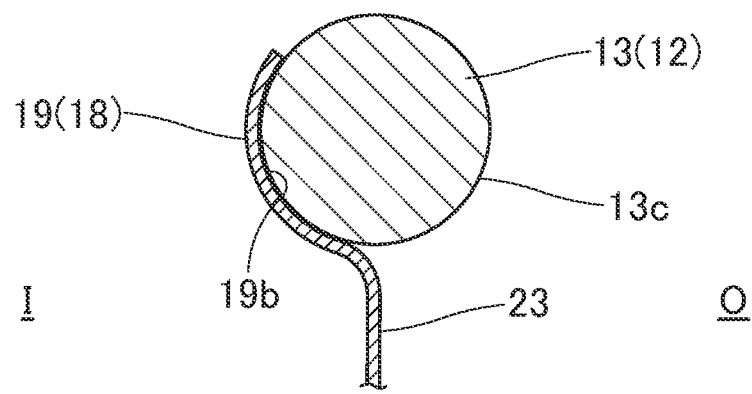
FIG. 6 is a schematic partial end view of the attachment bracket and the inflator, which corresponds to a portion taken along line VI-VI of FIG. 4.
Figure 7:
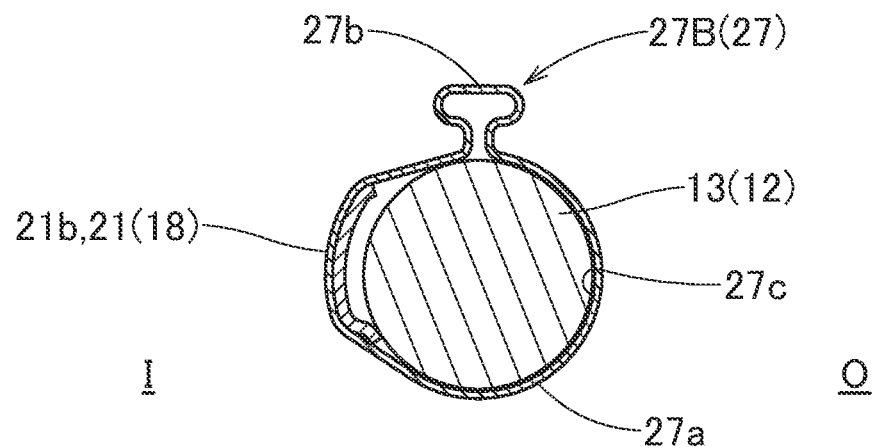
FIG. 7 is a schematic partial end view of the attachment bracket and the inflator, which corresponds to a portion taken along line VII-VII of FIG. 4.

As shown in FIG. 3, the holding portion 18 has an elongated shape substantially following along the front-rear direction so as to be disposed in an area of the body portion 13 excluding both front and rear end sides. Further, the holding portion 18 is formed by being curved in a substantially arc-shaped cross section so as to substantially follow along the outer peripheral surface of the body portion 13, and is disposed so as to partially cover the outer peripheral surface of the body portion 13 (FIG. 2). The holding portion 18 includes a body portion 19 configured to connect the attachment piece portions 23, a front end side portion 20 extending forward from the body portion 19, and a rear end side portion 21 extending rearward from the body portion 19. In the case of the embodiment, the body portion 19 is configured to cover a lower surface side of the body portion 13 of the inflator 12 by about ⅓ in the cross section on an axially orthogonal direction side of the inflator 12 in the state of being mounted in the vehicle, and is configured to be capable of supporting the lower surface side of the body portion 13 of the inflator 12 via a support surface 19b on an inner peripheral surface side except for a portion of a protrusion-shaped portion 25 which will be described later (see FIGS. 2 and 6). More specifically, the body portion 19 covers a lower side of a lower end point 13ca located on a lowermost side in an outer peripheral surface 13c of the body portion 13 in the state of being mounted in the vehicle, and is formed so as to extend from the lower end point 13ca to the inside and outside of the vehicle (both sides in a vehicle width direction) (see FIG. 2). The front end side portion 20 is formed by cutting away an upper portion to be narrower than the body portion 19 vertically, and the rear end side portion 21 is formed by expanding the diameter with respect to the body portion 19 (see FIGS. 3 to 5, 7, and 8). The holding portion 18 is configured to be capable of holding the inflator 12 by using the clamp 27 (27F and 27B) as the connecting means disposed so as to wrap the entire circumference in the circumferential direction on an outer peripheral side of the inflator 12. In the case of the embodiment, the clamp 27 (27F and 27B) is made of sheet metal and as shown by two-dot chain lines in FIGS. 4 and 6, one is disposed in each of the area of the front end side portion 20 and the area of the rear end side portion 21. As shown in FIGS. 5 and 7, each clamp 27 (27F and 27B) has a belt-shaped belt portion 27a that covers the periphery of the body portion 13 of the inflator 12 and the holding portion 18, and a reduced diameter portion 27b that is capable of reducing a diameter of the belt portion 27a, and is configured such that the belt portion 27a can cover the periphery of the body portion 13 and the holding portion 18 (clamp assembly portions 20c and 21b of the front end side portion 20 and the rear end side portion 21) without any gap.

The front end side portion 20 is a portion inserted into the inflow port portion 38 of the airbag 35 together with the inflator 12. The clamp 27F disposed on a front side is disposed on an outer peripheral side of the inflow port portion 38 of the airbag 35. The clamp 27F connects the inflow port portion 38 and the inflator 12, and attaches the inflator 12 to the attachment bracket 17 (see FIG. 5). Specifically, the front end side portion 20 has an enlarged diameter portion 20a of which a diameter is enlarged so as to provide a step on a tip end side. The front end side portion 20 has a configuration in which the clamp 27F is wound around an outer peripheral side of a base-portion side portion 20b, which is a base side (body portion 19 side) of the enlarged diameter portion 20a (see FIGS. 4, 5, and 8). In the front end side portion 20, at the portion of the clamp assembly portion 20c around which the clamp 27F is wound, as shown in FIG. 5, the body portion 13 of the inflator 12 is supported on the lower surface side by a support surface 20d, and an area other than the lower surface side is supported by an inner peripheral surface 27c of the belt portion 27a of the clamp 27F in a state in which the inflow port portion 38 is interposed therebetween. The enlarged diameter portion 20a is formed to prevent extraction of the clamp 27F which is wound with the inflow port portion 38 of the airbag 35 interposed therebetween.

Figure 8:
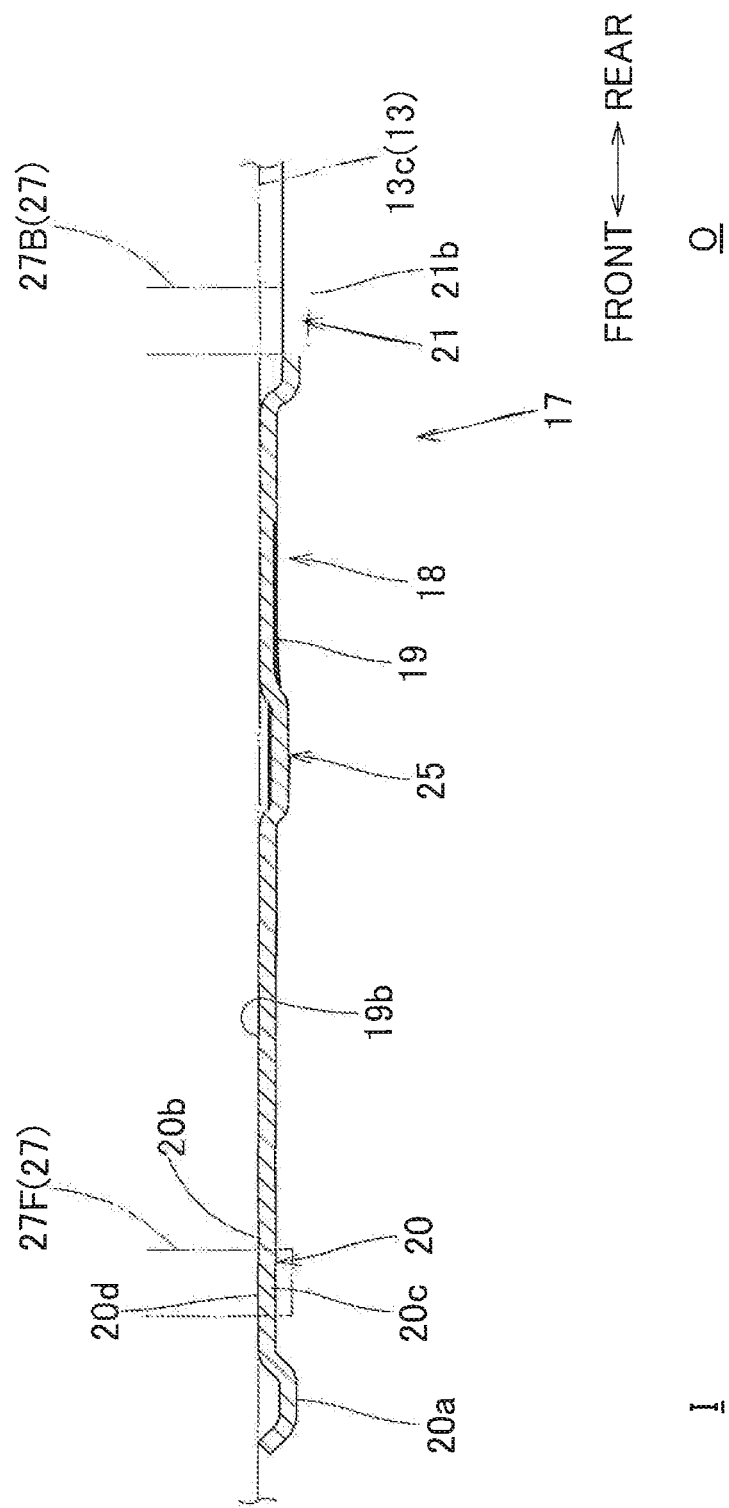
FIG. 8 is a schematic end view of the attachment bracket of FIG. 3 along a front-rear direction.

Since the rear end side portion 21 is formed with an enlarged diameter with respect to the body portion 19 as described above, the clamp 27B disposed in the area of the rear end side portion 21 is configured to hold the body portion 13 in a state in which a gap is provided between the rear end side portion 21 and the body portion 13 of the inflator 12 (see FIGS. 7 and 8). That is, in the rear end side portion 21, at the portion of the clamp assembly portion 21b around which the clamp 27B is wound, the body portion 13 of the inflator 12 is provided with the gap between the lower surface side and the clamp assembly portion 21b, but an area other than the lower surface is supported by the inner peripheral surface 27c of the belt portion 27a of the clamp 27B (see FIG. 7). The rear end side portion 21 has protrusion portions 21a and 21a protruding in the circumferential direction on both edge sides on the rear end side (see FIGS. 3 and 4). These protrusion portions 21a are formed to prevent extraction of the clamp 27B.

In the case of the embodiment, in the state of being mounted in the vehicle, the attachment piece portion 23 is formed in a flat plate shape extending downward on the exterior vehicle side from an outer edge 19a of the body portion 19 of the holding portion 18. The attachment piece portion 23 is configured such that a width dimension on a front-rear direction side is substantially the same as a width dimension on a front-rear direction side of the body portion 19 in the holding portion 18 (see FIGS. 3 and 4). Specifically, the attachment piece portion 23 is formed so as to extend from the outer edge 19a of the body portion 19 that covers the lower surface side of the body portion 13 in the inflator 12, and as shown in FIG. 2, in the state of being mounted in the vehicle, is configured so as to be disposed at a position where an extension line L1 extending substantially along the attachment piece portion 23 (specifically, an extension line extending along the surface of the attachment piece portion 23 on an exterior vehicle side O) is provided below a center C of the inflator 12 (body portion 13). The attachment piece portion 23 is formed with insertion holes 23a through which bolts (attachment means) 28 for fixing to the inner panel 2 on the body 1 side can be inserted, at two locations along the front-rear direction. The insertion hole 23a (assembling position for assembling the bolt 28) is formed at a position below the outer peripheral surface 13c (lower end point 13ca on the outer peripheral surface 13c) of the inflator 12 (body portion 13) in the state of being mounted in the vehicle (see FIG. 2). Further, although detailed illustration is omitted, on both front and rear edge sides of the attachment piece portion 23, locking claw portions 23b and 23b, which are capable of temporarily fixing the position of the attachment bracket 17 by being locked to a peripheral edge of the locking hole formed on an inner panel 2 side, are formed so as to protrude toward the exterior vehicle side O on the inner panel 2 side (see FIGS. 3 and 4). Further, in the attachment bracket 17 of the embodiment, in an area in the holding portion 18 from the substantially front and rear center of the body portion 19 to a substantially front and rear center of the attachment piece portion 23, a reinforcing protrusion-shaped portion 25 partially protruding to the inner periphery side (interior vehicle side I, that is, a side away from the inflator 12) is continuously formed substantially along the up-down direction (see FIGS. 3, 4, and 8). Specifically, the protrusion-shaped portion 25 is continuously formed of a substantially U-shaped cross section from an upper end side of the holding portion 18 to a lower end side of the attachment piece portion 23, including a boundary portion between the holding portion 18 and the attachment piece portion 23.

Each attachment bracket 30 is provided for attaching each attachment portion 39 formed on an upper edge side of the airbag 35 to the body 1 side. Although detailed illustration is omitted, each attachment bracket 30 is configured of two sheet metal plates, is attached to each attachment portion 39 so as to sandwich each attachment portion 39 from the inside and outside, and attaches each attachment portion 39 to the inner panel 2 on the body 1 side to be fixed using the bolt 32 (see FIG. 1).

When the inflation gas from the inflator 12 flows into the airbag 35 from a state of being folded and stored on the upper edge side of the windows W1 and W2, ss indicated by a two-dot chain line of FIG. 1. The airbag 35 is unfolded and inflated to cover the interior vehicle side of the windows W1 and W2, the intermediate pillar garnish 7, and the rear pillar garnish 8 in the center pillar portion CP and the rear pillar portion RP. The airbag 35 includes a bag body 36 (see a two-dot chain line in FIG. 1) that expands so as to cover the windows W1 and W2 on the interior vehicle side, attachment portions 39 that attach an upper edge side of the bag body 36 to the inner panel 2 on the body 1 side, and an inflow port portion 38 that allows the inflation gas to flow into the bag body 36 (see FIG. 1). A plurality of (in the embodiment, six) attachment portions 39 are formed along the front-rear direction. The inflow port portion 38 is formed so as to protrude upward from the upper edge side in the intermediate portion of the bag body 36 in the front-rear direction. More specifically, the inflow port portion 38 is formed at a position which is a substantially front and rear center of the bag body 36. The inflow port portion 38 is configured such that the inflator 12 can be inserted inside thereof and the rear end 38a side is open. In the case of the embodiment, the airbag 35 is stored on the upper edge side of the windows W1 and W2 in the state of the elongated completely folded body 45 along the front-rear direction by folding the bag body 36 so that a lower edge side approaches the upper edge side. In the embodiment, as shown in FIG. 2, the bag body 36 is folded in a bellows manner on the upper edge side and the lower area is folded by roll folding that winds from the lower edge side toward the exterior vehicle side O. Further, in the head protecting airbag device M of the embodiment, although detailed description is omitted, the completely folded body 45 is mounted in the vehicle V in a state of being partially stored in the synthetic resin case 50.

Next, mounting of the head protecting airbag device M of the embodiment in the vehicle V will be described. First, the bag body 36 of the airbag 35 is folded to form the completely folded body 45. After that, a predetermined portion around the completely folded body 45 is wrapped with a breakable wrapping material. Next, the attachment bracket 30 is attached to each attachment portion 39 protruding from the completely folded body 45. Then, the inflator 12, which is provided with the holding portion 18 of the attachment bracket 17 disposed at the periphery thereof is connected to the inflow port portion 38 by using the clamp 27F. At this time, the inflator 12 is held by the holding portion 18 of the attachment bracket 17 by using the clamps 27F and 27B. After that, the completely folded body 45 is stored in the case 50 to form the airbag assembly. The attachment brackets 17 and 30 are disposed at predetermined positions of the inner panel 2 on the body 1 side, and the bolts 28 and 32 are fastened. Then, a lead wire (not shown) extending from a predetermined control device for operating the inflator is connected to the connection port portion 15 of the inflator 12, the front pillar garnish 5 and the roof head lining 6 are attached to the inner panel 2 on the body 1 side, and further, when the pillar garnishes 7 and 8 are attached to the inner panel 2 on the body 1 side, the head protecting airbag device M can be mounted in the vehicle V.

After the head protecting airbag device M is mounted in the vehicle V, when the inflator 12 is operated in response to an operation signal from the control device (not shown), the inflation gas discharged from the inflator 12 flows into the airbag 35. Thus, an inflating bag body 36 pushes and opens the airbag cover 10, while unfolding and protruding downward, and is completely inflated to cover the interior vehicle side of the windows W1 and W2, the center pillar portion CP, and the rear pillar portion RP, as indicated by a two-dot chain line of FIG. 1 and FIG. 9.

Then, in the head protecting airbag device M of the embodiment, in the attachment bracket 17 for attaching the inflator 12 to the body 1 side of the vehicle V, the holding portion 18 (body portion 19), which partially covers the outer peripheral surface 13c of the inflator 12 (body portion 13), is disposed so as to cover the lower surface side of the inflator 12 in the state of being mounted in the vehicle. Therefore, the holding portion 18 can directly support the lower surface side of the inflator 12 and even if the holding portion 18 receives a force along the unfolding direction of the airbag 35, the attachment bracket 17 can accurately counteract the force. As a result, the strength required for holding the inflator can be stably secured as the attachment bracket 17.

Therefore, in the head protecting airbag device M of the embodiment, the inflator 12 can be stably held by the attachment bracket 17.

In the head protecting airbag device M of the embodiment, the clamp 27 (27F and 27B) as the connecting means is disposed so as to surround the entire circumference in the circumferential direction on an outer peripheral side of the body portion 13 of the inflator 12, and the inflator 12 is held by the holding portion 18. The lower surface side of the inflator 12 is supported by the attachment bracket 17 itself. That is, since the inflator 12 is not held by the clamp 27 itself, it is not necessary to use the clamp 27 of which the strength is increased so that the inflator can be held by the clamp itself.

In particular, in the head protecting airbag device M of the embodiment, in the vicinity of the front and rear center of the attachment bracket 17, from the body portion 19 to the attachment piece portion 23 of the holding portion 18, the reinforcing protrusion-shaped portion 25, which partially protrudes to the interior vehicle side (side away from the inflator 12), is continuously formed. That is, a rib-shaped portion is formed from the body portion 19 to the attachment piece portion 23 so as to straddle these boundary portions and partially protrude toward an inner peripheral side substantially along the up-down direction in a U-shaped cross section. Therefore, even if a force, which compresses the vicinity of the boundary portion between the body portion 19 supporting the body portion 13 of the inflator 12 and the attachment piece portion 23, acts when the airbag 35 is unfolded and inflated, the rib-shaped portion (protrusion-shaped portion 25) that partially protrudes to the inner peripheral side can counteract such a force, and can ensure a sufficient strength.

Further, in the head protecting airbag device M of the embodiment, the assembly position (insertion hole 23a) for assembling the bolt 28 as the attachment means in the attachment piece portion 23 is located below the lower surface side (lower end point 13ca in the outer peripheral surface 13c) of the inflator 12 in the state of being mounted in the vehicle. In other words, the attachment piece portion 23 is formed so as to extend downward from the holding portion 18 and is attached to the body 1 side at a position below the holding portion 18. Therefore, the width dimension of the attachment bracket 17 on a vehicle width direction (left-right direction) side in the state of being mounted in the vehicle can be made smaller than that in a case in which the attachment piece portion is disposed so as to protrude from the holding portion to the exterior vehicle side. Of course, if such a point is not taken into consideration, the attachment piece portion may be disposed so as to extend from the holding portion to the exterior vehicle side at a position on the exterior vehicle side from the lower end point of the outer peripheral surface of the inflator.

Further, in the head protecting airbag device M of the embodiment, the attachment piece portion 23 has a substantially flat plate shape, and is configured such that the extension line L1 extending to the interior vehicle side I substantially along the attachment piece portion 23 is located at a position below the center C of the inflator 12 (body portion 13) supported by the holding portion 18 in the state of being mounted in the vehicle. Therefore, in the attachment bracket 17, an edge portion (outer edge 19a, boundary portion with the attachment piece portion 23) on the exterior vehicle side in the holding portion 18 (body portion 19) can be located on a relatively lower side. In other words, an increase in size of the holding portion 18 (body portion 19) can be suppressed, and the attachment bracket 17 can be made compact by suppressing bulkiness. In particular, in the head protecting airbag device M of the embodiment, the body portion 19 of the holding portion 18 is configured to cover only about ⅓ of the outer peripheral surface 13c of an area on the lower side of the body portion 13 in the inflator 12 in a cross section on an axially orthogonal direction side of the inflator 12 so as to straddle the lower end point 13ca, and is configured to be as compact as possible. Therefore, an increase in size of the attachment bracket 17 can be suppressed, the attachment bracket 17 can be smoothly stored even in a narrow storage space on the upper edge side of the windows W1 and W2, and an increase in weight of the device itself can be suppressed. Of course, if such a point is not taken into consideration, the attachment piece portion may be disposed at a position where the extension line extending substantially along the attachment piece portion is located above the center of the inflator.

Figure 9:
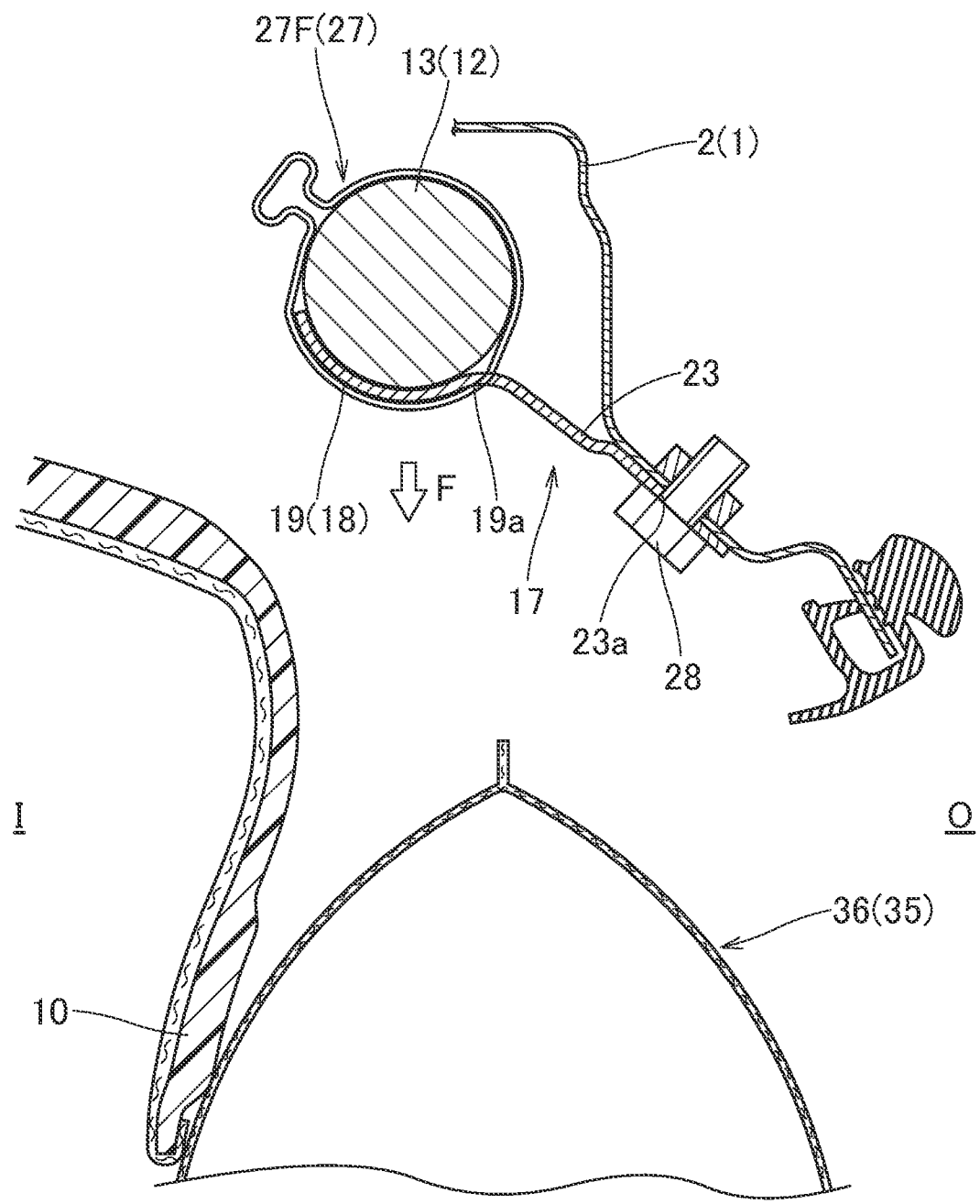
FIG. 9 is a vertical sectional view showing a state in which inflation of the airbag is completed in the head protecting airbag device of the embodiment.

Furthermore, in the head protecting airbag device M of the embodiment, in the airbag 35, the inflow port portion 38 connected to the inflator 12 for allowing the inflation gas to flow into the inside thereof is formed so as to protrude from the upper edge side at an intermediate portion of the bag body 36 in the front-rear direction. That is, in the head protecting airbag device M of the embodiment, the inflator 12 is disposed in the vicinity of the intermediate portion of the airbag 35 in the front-rear direction that is unfolded so as to protrude significantly downward when being unfolded and inflated (see FIG. 1). However, as shown in FIG. 9, in the inflator 12, the lower surface side on the interior vehicle side, which is the protruding direction side of the airbag 35, is covered by the holding portion 18 (body portion 19) of the attachment bracket 17. Therefore, even if the inflator 12 receives a large tensile force F that moves downward on the interior vehicle side along with the inflating airbag 35, such a tensile force F can be counteracted. As a result, the inflator 12 can be stably held by the holding portion 18, and the inflation of the airbag 35 can be quickly completed. Of course, if such a point is not taken into consideration, the inflow port portion may be disposed on the front end side or the rear end side of the airbag so that the inflator is disposed on the front end side or the rear end side when the inflation of the airbag is completed.

An aspect of the present disclosure is to provide a head protecting airbag device having the following configuration.

The head protecting airbag device includes an airbag that is configured to cover a window of a vehicle when being unfolded and inflated, and that is folded and stored on an upper edge side of the window on an interior vehicle side; an inflator that has a substantially cylindrical outer shape of which an axial direction is disposed substantially along a front-rear direction and that supplies inflation gas to the airbag; and an attachment bracket that attaches the inflator to a body side on the upper edge side of the window, in which the attachment bracket is made of sheet metal, and includes a holding portion that is formed by being curved in a substantially arc-shaped cross section so as to substantially follow along an outer peripheral surface of the inflator, is disposed so as to partially cover the outer peripheral surface of the inflator, and is configured to be capable of holding the inflator using connecting means disposed so as to surround an entire circumference in a circumferential direction on an outer peripheral side of the inflator, and an attachment piece portion that is formed so as to extend from an end edge of the holding portion on an exterior vehicle side and that is attached to the body side by using attachment means, the holding portion is disposed so as to cover and support a lower surface side of the inflator in a state where the airbag device is mounted in the vehicle.

In the head protecting airbag device of the present disclosure, in the attachment bracket for attaching the inflator to the body side of the vehicle, the holding portion that partially covers the outer peripheral surface of the inflator is disposed so as to cover the lower surface side of the inflator in a state where the airbag device is mounted in the vehicle. Therefore, the holding portion can directly support the lower surface side of the inflator and even if a force is applied along the unfolding direction of the airbag, the attachment bracket can accurately counteract against the force. Therefore, with the attachment bracket, the strength required for holding the inflator can be stably secured.

Therefore, in the head protecting airbag device of the present disclosure, the inflator can be stably held by the attachment bracket.

Further, in the head protecting airbag device of the present disclosure, if the assembly position for assembling the attachment means at the attachment piece portion is configured to be located below the lower surface side of the inflator in the state of being mounted in the vehicle, the attachment piece portion is formed so as to extend downward from the holding portion and is attached to the body side at a position below the holding portion. Therefore, the width dimension of the attachment bracket on the vehicle width direction (left-right direction) side in the state of being mounted in the vehicle can be made smaller than that in a case in which the attachment piece portion is disposed so as to protrude from the holding portion to the exterior vehicle side, which is preferable.

Further, in the head protecting airbag device having the above configuration, if the attachment piece portion has a substantially flat plate shape and the extension line extending substantially along the attachment piece portion is disposed at a position below the center of the inflator that is supported by the holding portion in the state of being mounted in the vehicle, the edge portion (boundary portion with the attachment piece portion) in the holding portion on the exterior vehicle side can be located relatively lower in the attachment bracket. In other words, since the increase in size of the holding portion can be suppressed, the attachment bracket can be made compact by suppressing bulkiness, which is preferable.

Furthermore, in the head protecting airbag device having the above configuration, if the inflow port portion, which is connected to the inflator in the airbag and allows the inflation gas to flow into the inside thereof, is formed to protrude from the upper edge side in the intermediate portion in the front-rear direction, the inflator is disposed in the vicinity of the intermediate portion of the unfolding airbag in the front-rear direction so as to protrude significantly downward when being unfolded and inflated. Since in the inflator, the lower surface side on the interior vehicle side, which is the protruding direction side of the airbag, is covered by the holding portion of the attachment bracket, even if the inflator receives a large tensile force downward on the interior vehicle side due to the expanding airbag, the tensile force can be counteracted, the inflator can be stably held by the holding portion, and the inflation of the airbag can be quickly completed, which is preferable.

What is claimed is:
1. A head protecting airbag device comprising:
an airbag that is configured to cover a window of a vehicle when being unfolded and inflated, and that is folded and stored on an upper edge side of the window on an interior vehicle side;
an inflator that has a substantially cylindrical outer shape of which an axial direction is disposed substantially along a front-rear direction and that supplies inflation gas to the airbag; and
an attachment bracket that attaches the inflator to a body side on the upper edge side of the window, wherein:
the attachment bracket is made of sheet metal,
the attachment bracket includes
a holding portion that
is formed by being curved in a substantially arc-shaped cross section so as to substantially follow along an outer peripheral surface of the inflator,
is disposed so as to partially cover the outer peripheral surface of the inflator, and is configured to be capable of holding the inflator using a clamp disposed so as to surround an entire circumference in a circumferential direction on an outer peripheral side of the inflator, and an attachment piece portion that is formed so as to extend from an end edge of the holding portion on an exterior vehicle side and that is attached to the body side using a bolt, the holding portion is disposed so as to cover and support a lower surface side of the inflator, as viewed in cross section in the axial direction of the inflator, in a state where the airbag device is mounted in the vehicle, and in the attachment bracket, a reinforcing protrusion-shaped portion that partially protrudes on the interior vehicle side from the holding portion to the attachment piece portion is continuously formed.

2. The head protecting airbag device according to claim 1, wherein the attachment piece portion is configured such that an assembling position for assembling the bolt is located below the lower surface side of the inflator in the state where the airbag device is mounted in the vehicle.

3. The head protecting airbag device according to claim 1, wherein the attachment piece portion has a substantially flat plate shape and is configured such that an extension line extending substantially along the attachment piece portion is disposed at a position below a center of the inflator supported by the holding portion in a state where the airbag device is mounted in the vehicle.

4. The head protecting airbag device according to claim 1, wherein in the airbag, an inflow port portion connected to the inflator for allowing the inflation gas to flow into the airbag is formed so as to protrude from an upper edge side in an intermediate portion in the front-rear direction.

* * * * *